(12) United States Patent
Holt

(10) Patent No.: US 8,209,393 B2
(45) Date of Patent: Jun. 26, 2012

(54) MULTIPLE MACHINE ARCHITECTURE WITH OVERHEAD REDUCTION

(75) Inventor: John M. Holt, Essex (GB)

(73) Assignee: Waratek Pty Ltd., Lindfield, NSW (AU)

( * ) Notice: Subject to any disclaimer, the term of this patent is extended or adjusted under 35 U.S.C. 154(b) by 701 days.

(21) Appl. No.: 12/011,216

(22) Filed: Jan. 23, 2008

(65) Prior Publication Data
US 2008/0189385 A1 Aug. 7, 2008

Related U.S. Application Data

(62) Division of application No. 11/583,359, filed on Oct. 18, 2006, now Pat. No. 7,958,322.

(60) Provisional application No. 60/730,544, filed on Oct. 25, 2005.

(51) Int. Cl.
*G06F 15/167* (2006.01)
*G06F 12/00* (2006.01)
*G06F 13/00* (2006.01)
*G06F 13/28* (2006.01)

(52) U.S. Cl. ............... 709/214; 711/153; 711/148

(58) Field of Classification Search ................ 709/214; 711/100, 147, 148, 154
See application file for complete search history.

(56) References Cited

U.S. PATENT DOCUMENTS

| | | | |
|---|---|---|---|
| 4,414,624 A | 11/1983 | Summer, Jr. et al. | |
| 4,969,092 A | 11/1990 | Shorter | |
| 5,214,776 A | 5/1993 | Bagnoli et al. | |
| 5,291,597 A | 3/1994 | Shorter | |
| 5,418,966 A | 5/1995 | Madduri | |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,609 A | 10/1996 | Sugiyama et al. | |
| 5,612,865 A | 3/1997 | Dasgupta | |
| 5,802,585 A | 9/1998 | Scales et al. | |
| 5,918,248 A | 6/1999 | Newell et al. | |
| 6,049,809 A | 4/2000 | Raman et al. | |
| 6,148,377 A * | 11/2000 | Carter et al. | ............... 711/147 |

(Continued)

FOREIGN PATENT DOCUMENTS

EP 0969377 1/2000

(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner* — Faruk Hamza
*Assistant Examiner* — Benjamin Ailes
(74) *Attorney, Agent, or Firm* — Pillsbury Winthrop Shaw Pittman LLP

(57) ABSTRACT

A multiple computer environment is disclosed in which an application program executes simultaneously on a plurality of computers (M1, M2, . . . Mn) interconnected by a communications network and in which the local memory of each computer is not maintained substantially the same by updating in due course. An address table mechanism is provided to permit access to an asset, object, or structure (i.e., memory location) for the purpose of updating, for example. Not all computers have the same memory, so it is not necessary for all computers to be updated.

65 Claims, 4 Drawing Sheets

U.S. PATENT DOCUMENTS

| | | | |
|---|---|---|---|
| 6,163,801 | A | 12/2000 | O'Donnell et al. |
| 6,192,514 | B1 | 2/2001 | Lurndal |
| 6,314,558 | B1 | 11/2001 | Angel et al. |
| 6,324,587 | B1 | 11/2001 | Trenbeath et al. |
| 6,327,630 | B1 | 12/2001 | Carroll et al. |
| 6,370,625 | B1 | 4/2002 | Carmean et al. |
| 6,389,423 | B1 | 5/2002 | Sakakura |
| 6,421,686 | B1 * | 7/2002 | Martin, Jr. .................... 1/1 |
| 6,425,016 | B1 | 7/2002 | Banavar et al. |
| 6,571,278 | B1 | 5/2003 | Negishi et al. |
| 6,574,628 | B1 | 6/2003 | Kahn et al. |
| 6,574,674 | B1 | 6/2003 | Mairs et al. |
| 6,611,955 | B1 | 8/2003 | Logean et al. |
| 6,625,751 | B1 | 9/2003 | Starovic et al. |
| 6,668,260 | B2 | 12/2003 | Zoltan |
| 6,757,896 | B1 | 6/2004 | Cohen et al. |
| 6,760,903 | B1 | 7/2004 | Morshed et al. |
| 6,775,831 | B1 | 8/2004 | Carrasco et al. |
| 6,779,093 | B1 | 8/2004 | Gupta |
| 6,782,492 | B1 | 8/2004 | Nakaso |
| 6,823,511 | B1 | 11/2004 | McKenney et al. |
| 6,862,608 | B2 | 3/2005 | Buhlman et al. |
| 6,954,794 | B2 | 10/2005 | Rudd et al. |
| 6,968,372 | B1 | 11/2005 | Thompson et al. |
| 7,007,190 | B1 * | 2/2006 | Kurapati et al. ................ 714/4 |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 7,222,221 | B1 * | 5/2007 | Agesen et al. ................ 711/141 |
| 7,237,077 | B1 * | 6/2007 | Patterson et al. ............ 711/162 |
| 7,290,018 | B2 * | 10/2007 | Muecklich et al. .......... 707/624 |
| 7,499,958 | B1 * | 3/2009 | Ionescu ................................ 1/1 |
| 7,546,364 | B2 * | 6/2009 | Raman et al. ................ 709/224 |
| 7,680,995 | B1 * | 3/2010 | Chang .......................... 711/162 |
| 7,698,374 | B2 * | 4/2010 | Ido et al. ....................... 709/216 |
| 7,966,285 | B2 * | 6/2011 | Sawadsky et al. ........... 707/610 |
| 2002/0199172 | A1 | 12/2002 | Bunnell |
| 2003/0004924 | A1 | 1/2003 | Williams |
| 2003/0005407 | A1 | 1/2003 | Hines |
| 2003/0067912 | A1 | 4/2003 | Mead et al. |
| 2003/0105816 | A1 | 6/2003 | Goswami |
| 2003/0158868 | A1 * | 8/2003 | Zoltan .......................... 707/201 |
| 2003/0172158 | A1 * | 9/2003 | Pillai et al. .................... 709/225 |
| 2004/0025079 | A1 * | 2/2004 | Srinivasan et al. ............. 714/13 |
| 2004/0073828 | A1 | 4/2004 | Bronstein |
| 2004/0093588 | A1 | 5/2004 | Gschwind et al. |
| 2004/0158819 | A1 | 8/2004 | Cuomo et al. |
| 2004/0163077 | A1 | 8/2004 | Dimpsey et al. |
| 2005/0039171 | A1 | 2/2005 | Avakian et al. |
| 2005/0086384 | A1 | 4/2005 | Ernst |
| 2005/0108481 | A1 | 5/2005 | Iyengar et al. |
| 2005/0240737 | A1 | 10/2005 | Holt |
| 2005/0257219 | A1 | 11/2005 | Holt |
| 2005/0262313 | A1 | 11/2005 | Holt |
| 2005/0262513 | A1 | 11/2005 | Holt |
| 2006/0020913 | A1 | 1/2006 | Holt |
| 2006/0080389 | A1 | 4/2006 | Powers et al. |
| 2006/0095483 | A1 | 5/2006 | Holt |
| 2006/0143350 | A1 | 6/2006 | Miloushev et al. |
| 2006/0167878 | A1 | 7/2006 | Hartman |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2008/0072238 | A1 | 3/2008 | Monnie et al. |
| 2008/0189700 | A1 | 8/2008 | Schmidt et al. |
| 2010/0287397 | A1 * | 11/2010 | Naor et al. .................... 713/324 |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal et al., "Experience with Distributed Programming in Orca", *Proc. IEEE CS International Conference on Computer Languages*, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems", *IEEE Transactions on Software Engineering*, 18(3):190-205 (2002).

Bal et al., "Replication Techniques for Speeding up Parallel Applications on Distributed Sysytems", *Concurrency Practice & Experience*, 4(5):337-355 (1992).

Bressoud, T.C. TFT: "A Software System for Application-Transparent Fault Tolerance. Proc.", $28^{th}$ Annual International Symposium on Fault-Tolerant Computing, pp. 128-137 (1998).

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", $28^{th}$ Annual International Symposium on Fault-Tolerant Computing, pp. 128-137, Jun. 1998, Munich, Germany.

Chen, et al., "Multi-Jay: a distributed shared memory system based on multiple Java virtual machines." Proc. of Conf. on Parallel & Distrib. Proc. Techs. & Appls., Las Vegas, NV, Jun. 1998.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5—Retreived from the internet URL:http//www.springerlink.com/content/5v 028411810p6m700/>, vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, pp. 491-498, WP010095684 ISBN:978-0-8186-3770-4.

Russ, et al. "The hector distributed run-time environment", IEEE Transactions on Parallel and Distributed Systems, vol. 9, No. 111998, May 22, 1998.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Dasilva, et al., "An Evaluation of cJava System Architecture," IEEE, Proceedings of 15th Symposium on Computer Architecture and High Performance Computing, San Paulo, Brazil, Nov. 10-12, 2003, pp. 1-9.

Goethe, et al., "The Distributed Ada Run-Time System DARTS," Software Practice and Experience, vol. 21, No. 1, Aug. 4, 1989, pp. 1249-1263.

Haumacher, et al., "Transparent Distributed Threads for Java," IEEE, Proceedings of the International Parallel and Distributed Processing Symposium, Apr. 2003, pp. 22-26.

Radovic, et al., "Removing the Overhead from Software-Based Shared Memory," 2001 Proceedings, ACM/IEEE Conference on Supercomputing (CDrom), Denver, Colorado, Nov. 10-16, 2001, Supercomuting 2001, ACM Press, New York.

Sanchez, et al., "Distributed Garbage Collection for Wide Area Replicated Memory," Proceedings of the 6th Conference on Usenix Conference on Object-Oriented Technologies and Systems [on Line], vol. 6, Jun. 29, 2001, pp. 1-14. PI-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/ {veiga/papers/dgcwarm-coots-2001.pdf>.

Supplementary European Search Report, EP 06 79 0317.9, dated Mar. 5, 2009.

* cited by examiner

| OBJECTS | MACHINES |
|---|---|
| A | { M1, M2 } |
| B | { M1, M2, M4 } |
| C | { M1, M2, M3 } |
| D | { M2, M4 } |
| E | { M3 } |

| MACHINES | OBJECTS |
|---|---|
| M1 | { A, B, C } |
| M2 | { A, B, C, D } |
| M3 | { C, E } |
| M4 | { B, D } |

|   | M1  | M2  | M3  | M4  |   |   | Mn |
|---|-----|-----|-----|-----|---|---|----|
| A | YES | YES | NO  | NO  |   |   |    |
| B | YES | YES | NO  | YES |   |   |    |
| C | YES | YES | YES | NO  |   |   |    |
| D | NO  | YES | NO  | YES |   |   |    |
| E | NO  | NO  | YES | NO  |   |   |    |
|   |     |     |     |     |   |   |    |
| Z |     |     |     |     |   |   |    |

FIG. 6

MULTIPLE MACHINE ARCHITECTURE WITH OVERHEAD REDUCTION

CROSS-REFERENCE TO RELATED APPLICATIONS

This is a divisional of U.S. application Ser. No. 11/583,359 filed Oct. 18, 2006 now U.S. Pat. No. 7,958,322 entitled "Multiple Machine Architecture With Overhead Reduction," and claims benefit of U.S. Provisional Application No. 60/730,544 entitled "Multiple Machine Architecture with Overhead Reduction" filed Oct. 25, 2005; which is hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The need to update each local memory when any change is made to any memory location, creates a substantial overhead burden for the communications network which interconnects the multiple computers. It is towards reducing the above-mentioned overhead that the present invention is directed.

SUMMARY OF THE INVENTION

In accordance with a first aspect of the present invention there is disclosed in a multiple computer environment in which a different portion of an application program written to execute on only a single computer executes substantially simultaneously on a corresponding one of a plurality of computers, each having an independent local memory and each being interconnected via a communications network, and in which some memory locations are able to be referred to by a first plurality of said computers and in which other memory locations are able to be referred to by a second, and different, plurality of said computers, and after each occasion at which any one of said memory locations has its contents written to, or re-written, with a new content, or otherwise manipulated, any corresponding memory locations in said computers are in due course updated or manipulated via said communications network, the further improvement comprising the steps of:

(i) maintaining a record of which memory locations are present on which computers, and (ii) only in due course updating or manipulating those memory locations which correspond in said maintained record to an initially updated or manipulated memory location, thereby reducing the volume of updating or manipulating instructions passing over said communications network.

In accordance with a second aspect of the present invention there is disclosed a computer program product comprising a set of program instructions stored in a storage medium and operable to permit a plurality of computers to carry out the above defined method.

In accordance with a third aspect of the present invention there is disclosed a plurality of computers interconnected via a communications network and operable to ensure carrying out of the above described method.

In accordance with a fourth aspect of the present invention there is disclosed a computer system comprising a plurality of computers each having an independent local memory and each being interconnected via a communications network wherein a different portion of an application program written to execute on only a single computer executes substantially simultaneously on a corresponding one of said plurality of computers, some memory locations being referable to by a first plurality of said computers and other memory locations being referable to by a second, and different plurality of said computers, said system further comprising updating means associated with each said computer to in due course update each said memory location via said communications network after each occasion at which each said memory location has its content written to, or re-written, with a new content, or otherwise manipulated, wherein said updating means includes a record means of which memory locations are present on which computers, and said updating means only in due course updating, or manipulating, those memory locations which correspond in said record means to an initially updated or manipulated memory location, thereby reducing the volume of updating or manipulating instructions passing over said communications network.

In accordance with a fifth aspect of the present invention there is disclosed a single computer adapted to co-operate with at least one other computer in order to carry out the above method or form the above computer system.

BRIEF DESCRIPTION OF THE DRAWINGS

FIG. 3 is a schematic map of the memory locations of four computers, and FIGS. 4, 5 and 6 are each a different form of tabulation or listing of which memory objects are present in which computers

DETAILED DESCRIPTION

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

Figure 1A:
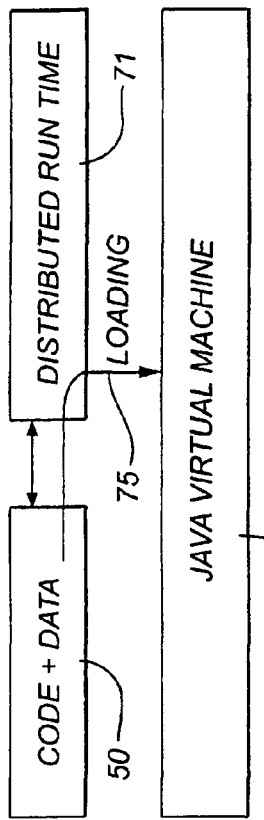
FIG. 1A is a schematic illustration of a prior art computer arranged to operate JAVA code and thereby constitute a single JAVA virtual machine.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" $2^{nd}$ Edition by T. Lindholm and F. Yellin of Sun Microsystems Inc of the USA which is incorporated herein by reference.

Figure 1B:
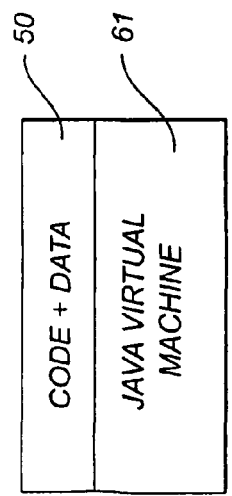
FIG. 1B is a drawing similar to FIG. 1A but illustrating the initial loading of code.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

Figure 1C:
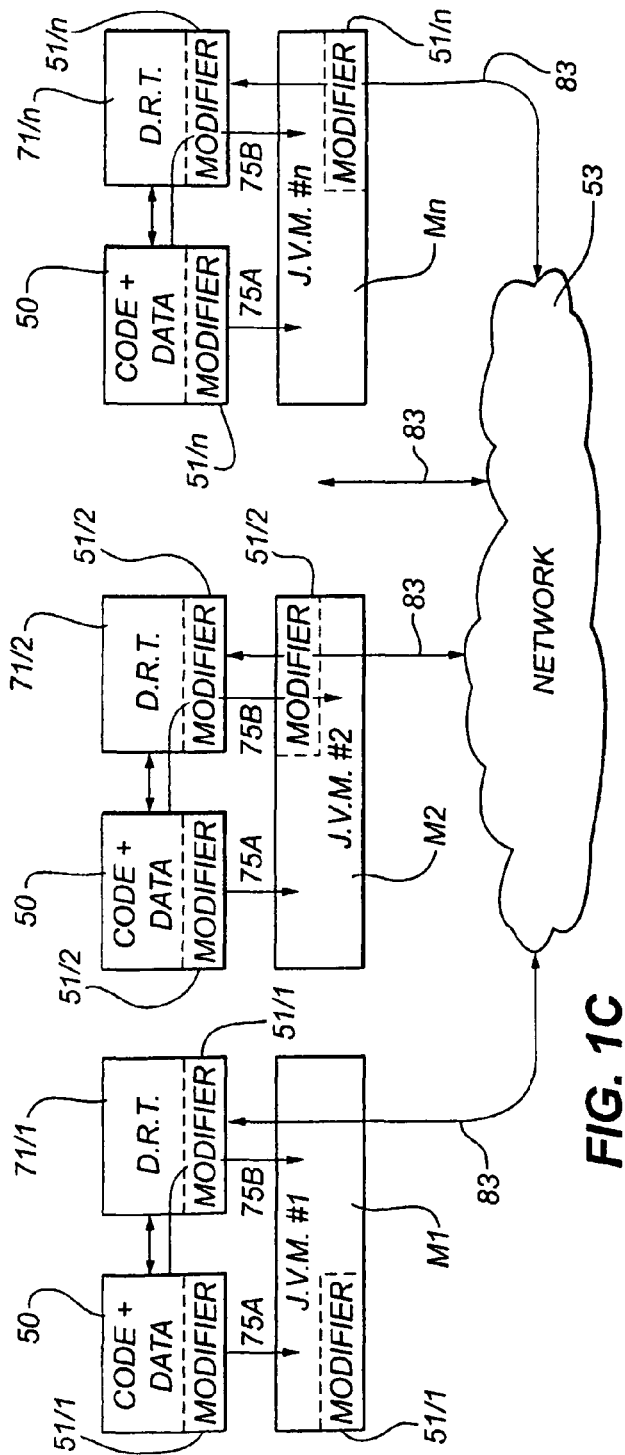
FIG. 1C illustrates the interconnection of a multiplicity of computers each being a JAVA virtual machine to form a multiple computer system, FIG. 2 schematically illustrates "n" application running computers to which at least one additional server machine X is connected as a server.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code.

Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT 71 and in other embodiments implemented as an adjunct to the application code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.ClassLoader.loadClass method (e.g. "java.lang.ClassLoader.loadClass( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

Figure 2:
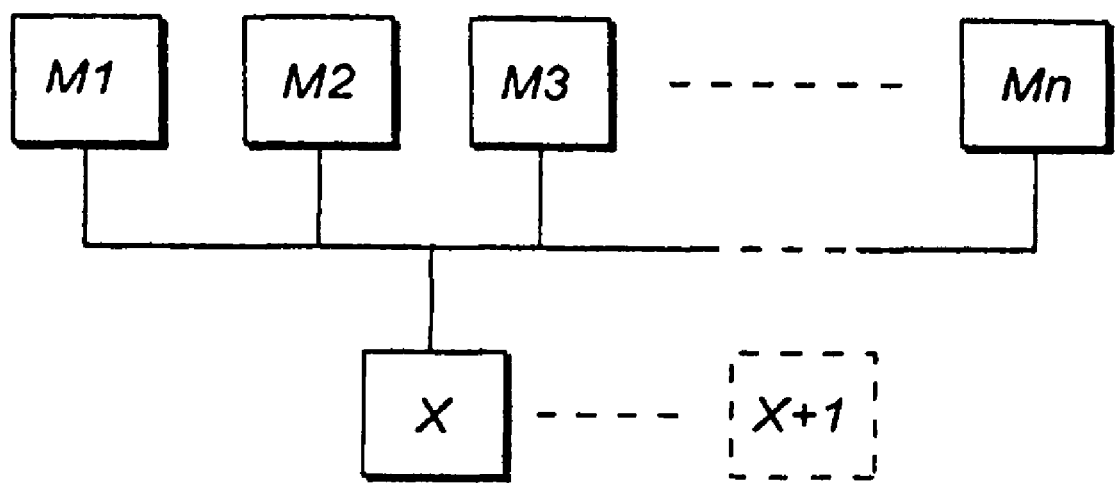

In connection with the above, it will be seen from FIG. 2 that there are a number of machines M1, M2, . . . Mn, "n" being an integer greater than or equal to two, on which the application program 50 of FIG. 1 is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However this would result in generally undesirable complexity. If the machine X is not provided then its functions, such as housekeeping functions, are provided by one, or some, or all of the other machines.

Figures 3, 4, 5:
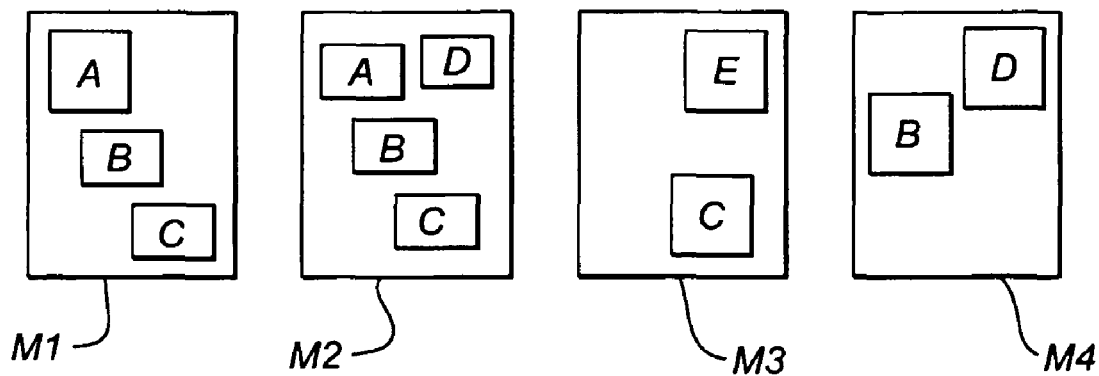

Turning now to FIG. 3, a schematic map of the memory locations of four machines M1-M4 forming a multiple computer system is illustrated. In this particular example, machine M1 has the memory locations A, B and C whilst machine M2 has the same memory locations and an additional memory location D. However, machine M3 only has memory locations C and E whilst machine M4 has memory locations B and D. It follows therefore that if memory location B has to be updated, then it is only necessary to advise machines M1, M2 and M4 and it is not necessary to advise machine M3. Thus the traffic on communications network 3 can be reduced since in this circumstance it is not necessary to communicate with machine M3.

FIGS. 4, 5 and 6 illustrate three different ways of tabulating or storing data which is sufficient to enable this reduction in communication overhead to be achieved.

In FIG. 4, for each object, or memory location, is maintained a list of machines which have a local copy of the object or location and thus should be communicated with in the event that the object or the contents of the location is to be changed, or manipulated in some way, such as for example by finalization or synchronization.

Conversely, in FIG. 5, for each machine is maintained a list of objects, or memory locations, present in the machine. Thus if a particular machine makes an amendment, for example, to a particular memory location then the server machine X can check through the list of machines in order to see, in turn, whether each machine refers to (such as a local copy of) the amended memory location and therefore requires to be updated.

In FIG. 6, a still further form of tabulation is provided which again enables the server machine X to determine what communications are required. Thus tabulation takes the form of an array listing the objects on one side and machines on the other and providing a relevant YES or NO in each cell corresponding to a possible object in each possible computer.

Once the above concept has been grasped, the arrangements described in detail in the abovementioned incorporated patent specifications are modified in a straightforward manner to ensure that each of the machines M1, M2, etc. of the multiple computer system only sends messages updating a specific memory location to that sub-set of machines having a corresponding memory location. One way of doing this is to consult the tabulation of any of FIGS. 4-6 in the process of assembling the addresses to which the updating message is broadcast or the updating messages are sent.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The tern "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) a pre-compilation procedure prior to loading,
(iii) compilation prior to loading,
(iv) "just-in-time" compilation(s), or
(v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the abovedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system The term "compromising" (and its grammatical variations) as used herein is used in the inclusive sense of "having" or "including" and not in the exclusive sense of "consisting only of".

To summarise, there is disclosed in a multiple computer environment in which a different portion of an application program written to execute on only a single computer executes substantially simultaneously on a corresponding one of a plurality of computers, each having an independent local memory and each being interconnected via a communications network, and in which some memory locations are able to be referred to by a first plurality of the computers and in which other memory locations are able to be referred to by a second, and different, plurality of the computers, and after each occasion at which any one of the memory locations has its contents written to, or re-written, with a new content, or otherwise manipulated, any corresponding memory locations in the computers are in due course updated or manipulated via the communications network, the further improvement comprising the steps of:

(i) maintaining a record of which memory locations are present on which computers, and (ii) only in due course updating or manipulating those memory locations which correspond in the maintained record to an initially updated or manipulated memory location, thereby reducing the volume of updating or manipulating instructions passing over the communications network.

Preferably the method comprises the step of:

(iii) maintaining the record as a listing of computers corresponding to each the memory location.

Alternatively the method comprises the step of:

(iv) maintaining the record as a listing of memory locations present in each the computer.

Alternatively the method comprises the step of:

(v) maintaining the record as a tabulation of all computers and all memory locations.

Preferably some of the memory locations and the other memory locations include common memory locations.

Preferably the first plurality of computers and the second plurality of computers include common computers.

Furthermore, there is also disclosed a computer system comprising a plurality of computers each having an independent local memory and each being interconnected via a communications network wherein a different portion of an application program written to execute on only a single computer executes substantially simultaneously on a corresponding one of the plurality of computers, some memory locations being referable to by a first plurality of the computers and other memory locations being referable to by a second, and different plurality of the computers, the system further comprising updating means associated with each the computer to in due course update each the memory location via the communications network after each occasion at which each the memory location has its content written to, or re-written, with a new content, or otherwise manipulated, wherein the updating means includes a record means of which memory locations are present on which computers, and the updating means only in due course updating, or manipulating, those memory locations which correspond in the record means to an initially updated or manipulated memory location, thereby reducing the volume of updating or manipulating instructions passing over the communications network.

Preferably the record means is a listing of computers corresponding to each the memory location.

Alternatively the record means is a listing of memory locations present in each computer.

Alternatively the record means is a tabulation of all computers and all memory locations.

Preferably some of the memory locations and the other memory locations include common memory locations.

Preferably the first plurality of computers and the second plurality of computers include common computers.

There is also disclosed a plurality of computers interconnected via a communications network and operable to ensure carrying out of the above-mentioned method(s).

In addition, there is also disclosed a computer program product comprising a set of program instructions stored in a storage medium and operable to permit a plurality of computers to carry out the abovementioned method(s).

Furthermore, there is also disclosed a single computer adapted to co-operate with at least one other computer in order to carry out the abovementioned method(s) or form the abovementioned computer system(s).

The invention claimed is:

1. A method of maintaining a replication table in a multiple computer system, the method comprising:
providing a plurality of computers each including a local processor and a local updateable memory coupled with the local processor including a first computer and a second computer interconnected via a communications link or network operating in a replicated shared memory arrangement,
classifying the updateable memory locations or values of said updateable memories into a first category of updateable memory locations each of which is replicated on two or more of said multiple computers and a second category of updateable memory locations each of which is present only in the specific one of said multiple computers in which each said second category updateable memory location is physically located, and
maintaining a replication table listing or recording the ones of said multiple computers on which a said first category updateable memory location is replicated,
wherein all memory reads are satisfied locally in each of the plurality of computers by reading replicated updateable memory locations present in each independent local memory of each computer of the plurality of computers.

2. The method of claim 1, further comprising:
maintaining one said replication table for each said first category memory location.

3. The method of claim 2, further comprising:
maintaining one said replication table for a plurality of first category memory locations.

4. The method of claim 3, further comprising:
maintaining one said replication table for each plurality of first category memory locations of potentially multiple pluralities.

5. A method as in claim 3, wherein said plurality of first category memory locations comprise plural memory locations of a related set of memory locations.

6. A method as in claim 5, wherein said related set of memory locations comprise an array of memory locations.

7. A method as in claim 6, wherein said array of memory locations comprise an array data structure.

8. A method as in claim 5, wherein said related set of memory locations comprise memory locations of an object or class.

9. A method as in claim 8, wherein said memory locations of an object or class comprise object fields or variables, or class fields or variables.

10. The method of claim 1, further comprising:
maintaining multiple said replication tables, one in each of said multiple computers.

11. The method of claim 1, further comprising:
maintaining multiple said replication tables, one of each said multiple tables in each of said multiple computers.

12. The method of claim 1, further comprising:
maintaining multiple said replication tables in each of said multiple computers.

13. The method of claim 1, further comprising:
maintaining one said replication table, for all said multiple computers on a further server computer.

14. A method as in claim 1, wherein said first category memory locations of a said computer do not access or refer to any second category memory locations of the same computer.

15. A method as in claim 14, wherein said access includes memory addresses of said second category memory locations.

16. A method as in claim 14, wherein said access includes pointers, references, handles, or links to or of said second category memory locations.

17. A method as in claim 1, wherein said memory locations comprise one or more objects.

18. A method as in claim 1, wherein said memory locations comprise one or more classes.

19. A method as in claim 1, wherein said memory locations comprise one or more object fields or one or more class fields.

20. A method as in claim 1, wherein said memory locations comprise one or more data structures.

21. A method as in claim 1, wherein said memory locations comprise one or more array data structures.

22. A method as in claim 1, wherein said memory locations comprise elements of one or more array data structures.

23. A method as in claim 1, wherein said memory locations comprise libraries, linked libraries, or dynamically linked libraries.

24. The method of claim 1, further comprising:
maintaining multiple replication tables of said first category memory locations, one in each of said plurality of computers, where each said replication table of each one of said plurality of computers lists or records first category memory locations replicated on a same one of said plurality of computers.

25. The method of claim 24, wherein each said replication table of each one of said plurality of computers does not list or record first category memory locations which are not replicated on the same one of said plurality of computers.

26. The method of claim 1, further comprising:
maintaining one said replication table for each said first category memory location, on each one of said multiple computers on which said first category memory location is replicated.

27. The method of claim 1, further comprising:
maintaining multiple said replication tables for each said first category memory location, one in each of said multiple computers on which said first category memory location is replicated.

28. The method of claim 1, further comprising:
maintaining one said replication table for a plurality of said first category memory locations, on each one of said multiple computers on which said plurality of first category memory locations are replicated.

29. The method of claim 1, further comprising:
maintaining multiple said replication table for a plurality of said first category memory location, one in each of said multiple computers on which said plurality of first category memory locations are replicated.

30. The method of claim 1, further comprising:
not maintaining a replication table of a first category memory location on ones of said multiple computers in which said first category memory location is not replicated.

31. The method of claim 1, further comprising:
not maintaining a replication table for a plurality of first category memory locations on ones of said multiple computers in which said plurality of first category memory locations are not replicated.

32. A method as in claim 28, wherein said plurality of first category memory locations comprise plural memory locations of a related set of memory locations.

33. A method as in claim 32, wherein said related set of memory locations comprise an array of memory locations.

34. A method as in claim 33, wherein said array of memory locations comprise an array data structure.

35. A method as in claim 32, wherein said replicated set of memory locations comprise memory locations of an object or class.

36. A method as in claim 35, wherein said memory locations of an object or class, comprise object fields or variables, or class fields or variables.

37. The method of claim 1, further comprising:
substantially simultaneously updating said first category memory locations of the other ones of said computers with any changes made to a first category memory location of any one of said computers.

38. The method of claim 37, further comprising:
utilizing said replication table listing to determine which ones of said multiple computers are to be said substantially simultaneously updated.

39. The method of claim 1, further comprising:
substantially simultaneously updating said first category memory locations of the other ones of said computers with any changes made to a first category memory location of any one of said computers;
utilizing said replication table listing to determine which ones of said multiple computers are to be said substantially simultaneously updated; and
not updating said second category memory locations of the other ones of said computers with any changes made to a second category memory location of any one of said computers.

40. A method as in claim 39, wherein said substantially simultaneous updating includes updating a first category memory locations of the other ones of said computers on which said first category memory locations is replicated, with any changes made to said first category memory locations of any one of said computers.

41. A method as in claim 39, wherein said substantially simultaneous updating excludes updating said first category memory locations of the other ones of said computers on which said first category memory locations is not replicated.

42. The method of claim 1, further comprising performing the classification into first and second categories including:
classifying said the memory locations or values of said local memories into the first category of memory locations each of which is replicated on two or more computers of said multiple computers; and
classifying said local memories into a second category of memory locations each of which is present only in the specific one of said multiple computers in which each said second category of memory location is physically located.

43. The method of claim 1, wherein said local memory of each said computer are independent of said local memory of each other computer.

44. The method of claim 1, wherein each of said local processors may only access said local memory of an associated computer in which a respective local processor is located.

45. A method as in claim 1, wherein at least a first application program written to operate on a single one of said computers, is operating substantially simultaneously on different ones of said multiple computers.

46. The method of claim 45, wherein said application program operating substantially simultaneously on each of said different ones of said computers may only access an associated local memory of an associated computer.

47. The method of claim 46, wherein said access is satisfied by said local memory of an associated computer independently of a local memory associated with any other computer.

48. The method of claim 46, wherein said access includes reading or writing content or values stored or resident within said local memory of an associated computer.

49. The method of claim 47, wherein said access includes reading or writing content or values stored or resident within said local memory of the associated computer.

50. A method as in claim 46, wherein said access is restricted to reading or writing content or values stored or resident within said local memory of the associated computer.

51. The method of claim 47, wherein said access is restricted to reading or writing content or values stored or resident within said local memory of the associated computer.

52. The method of claim 46, wherein said access includes reading or writing content or values of real or virtual memory addresses of or resident within said memory of the associated computer.

53. The method of claim 47, wherein said access includes reading or writing content or values of real or virtual memory addresses of or resident within said local memory of the associated computer.

54. The method of claim 48, wherein said access includes reading or writing content or values of real or virtual memory addresses of or resident within said local memory of the associated computer.

55. The method of claim 46, wherein said access is restricted to reading or writing content or values of real or virtual memory addresses of or resident within said local memory of the associated computer.

56. The method of claim 47, wherein said access is restricted to reading or writing content or values of real or virtual memory addresses of or resident within said local memory of the associated computer.

57. The method of claim 48, wherein said access is restricted to reading or writing content or values of real or virtual memory addresses of or resident within said local memory of the associated computer.

58. The method of claim 46, wherein at least one memory location or memory value of said application program is substantially similarly replicated in said local memory of said different ones of said multiple computers.

59. The method of claim 55, wherein said substantially similarly replicated memory locations or values are stored non-identically in respective memories of said different ones of said multiple computers.

60. The method of claim 56, wherein said substantially similarly replicated memory locations or values are updated through in-due-course updating to remain substantially similar upon occasion of any one of said plurality of computers simultaneously operating said application program modifying, or causing to be modified, a value or content of said substantially similarly replicated memory location or memory value.

61. A method as in claim 60, wherein said in-due-course updating provides that said replicated memory locations are updated to remain substantially similar upon occasion of any one of said computers simultaneously operating said application program causing modification of the contents of said replicated memory location.

62. The method of claim 60, wherein each said substantially similarly replicated memory location or value of each one of said multiple computers is identified with a substantially similar identifier.

63. The method of claim 1, wherein:
said local memory of each said computer are independent of said local memory of each other computer;
each of said local processors may only access an associated local memory of an associated computer in which the respective local processor is located;
at least a first application program written to operate on a single one of said computers is operating substantially simultaneously on different ones of said multiple computers;
said application program, operating substantially simultaneously on each of said different ones of said computers, may only access the associated local memory of the associated computer;
said access is satisfied by the associated local memory of the associated computer independently of an associated local memory of any other computer;
said access includes reading or writing content or values stored or resident within said associated local memory of the associated computer, or said access is restricted to reading or writing content or values stored or resident within said associated local memory of the associated computer;
said access includes reading or writing content or values of real or virtual memory addresses of or resident within associated local memory of the associated computer, or said access is restricted to reading or writing content or values of real or virtual memory addresses of or resident within said associated local memory of the associated computer;
at least one memory location or memory value of said application program is substantially similarly replicated in each of said local memories of said different ones of said multiple computers;
said substantially similarly replicated memory location or value are stored non-identically in respective local memories of said different ones of said multiple computers;
said substantially similarly replicated memory locations or values are updated through in-due-course updating to remain substantially similar upon occasion of any one of said plurality of computers simultaneously operating said application program modifying, or causing to be modified, the value or content of said substantially similarly replicated memory location or memory value;
said in-due-course updating provides that said replicated memory locations are updated to remain substantially similar upon occasion of any one of said computers simultaneously operating said application program causing modification of the contents of said replicated memory location; and
wherein each said substantially similarly replicated memory location or value of each one of said multiple computers is identified with a substantially similar identifier.

64. The method of claim 1, further comprising:
maintaining multiple replication tables of first category memory locations, one in each of said multiple computers, where each said replication table of each one of said multiple computers lists or records first category memory locations replicated on the same one of said multiple computers; and
substantially simultaneously updating said first category memory locations of the other ones of said computers with any changes made to a first category memory location of any one of said computers.

65. An article of manufacture comprising a computer program stored on a non-transitory computer readable memory device and comprising instructions which, when executed on a computer, perform in at least one single computer capable of interoperating with at least one other computer coupled to at least one said single computer at least intermittently via a communications network to form a multiple computer system having a plurality of computers wherein each computer has a local updateable memory and the multiple computer system operating in a replicated shared memory arrangement, said instructions when executed further comprising a method of classifying each said local updateable memory, said method comprising:
classifying memory locations or values of each of said local memories into a first category of updateable memory locations, each of which is replicated on two or more computers of said multiple computers;
classifying each of said local memories into a second category of updateable memory locations each of which is present only in specific ones of said multiple computers in which each said second category of memory location is physically located; and
maintaining a replication table listing or recording the ones of said multiple computers on which a said first category updateable memory location is replicated.

* * * * *